Figure 1:
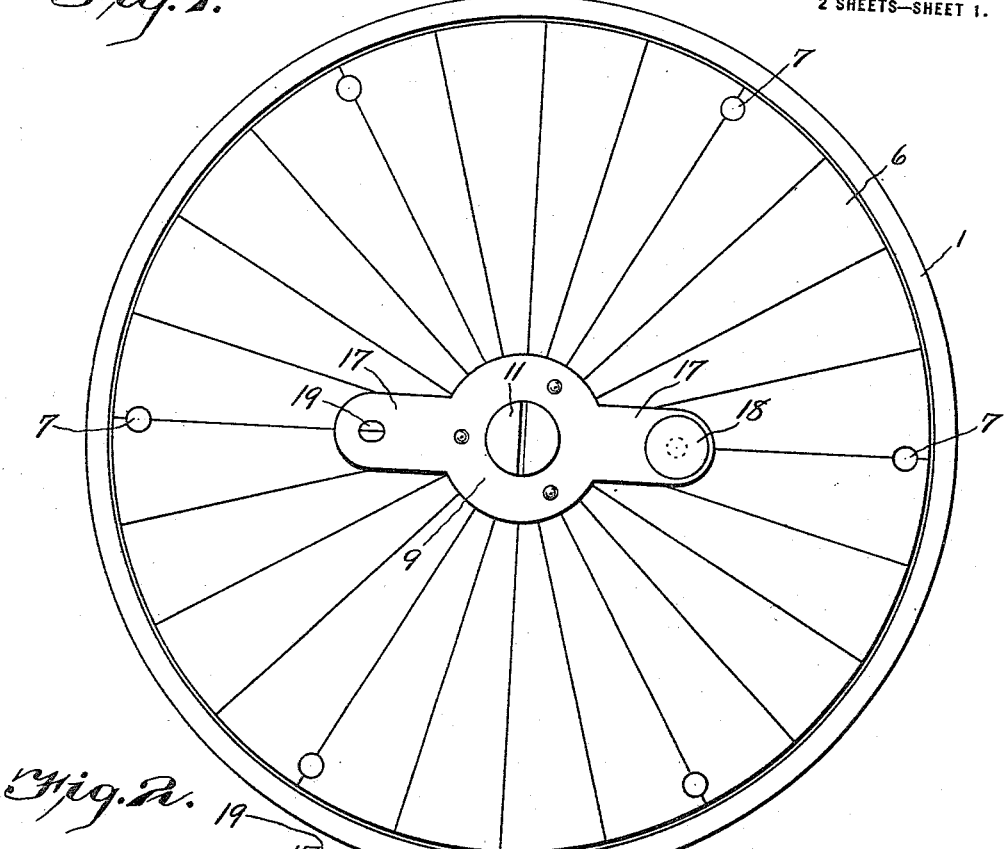

A. J. HODGE & H. B. RUGGLES.
HEAD FOR BARRELS AND THE LIKE.
APPLICATION FILED AUG. 7, 1915.

1,265,658.

Patented May 7, 1918.
2 SHEETS—SHEET 1.

Inventor
A. J. Hodge
H. B. Ruggles

By Wm H Bates

Attorney

A. J. HODGE & H. B. RUGGLES.
HEAD FOR BARRELS AND THE LIKE
APPLICATION FILED AUG. 7, 1915.
1,265,658.
Patented May 7, 1918.
2 SHEETS—SHEET 2.
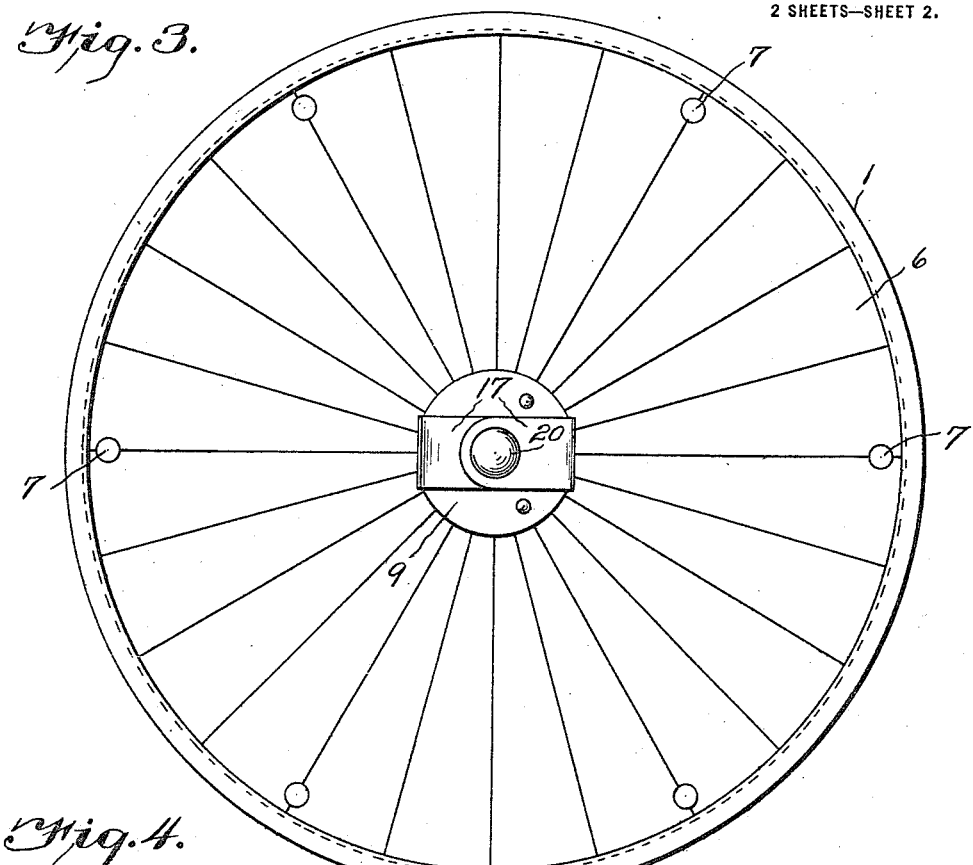
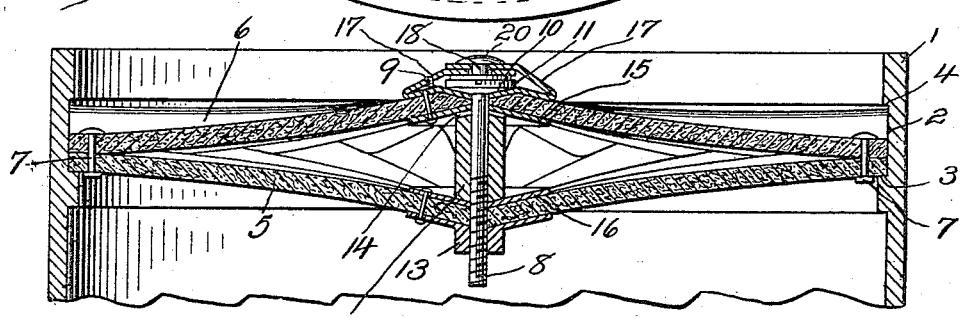
Inventor
A. J. Hodge
H. B. Ruggles
By Wm. H. Bates
Attorney

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY, OF ST. LOUIS, MISSOURI.

HEAD FOR BARRELS AND THE LIKE.

1,265,658.    Specification of Letters Patent.    Patented May 7, 1918.

Application filed August 7, 1915. Serial No. 44,238.

*To all whom it may concern:*

Be it known that we, ARTHUR J. HODGE and HENRY B. RUGGLES, citizens of the United States, residing at Pasadena, in the county of Los Angeles and State of California, have invented certain new and useful Improvements in Heads for Barrels and the like, of which the following is a specification.

This invention has relation to certain new and useful improvements in heads for barrels and the like, of the form shown in our co-pending application, Serial No. 20,453 and has for its primary object, the provision of a head formed of interlocked corrugated members secured together at points along their edges, so that when expanded radially to tighten the head and secure the same in a barrel or the like, the edges of said members will move outwardly together.

The invention has for another object, the provision of a removable head of this character in which the coöperating concavo-convex disks or head members will be arranged with their radial corrugations alternating to close the space between the edges of said disks or head members, and thereby prevent dust and other foreign matter from accumulating between said disks or head members, and also make it impossible for any party to insert a tool of any character between the disks or head members for the purpose of tampering with the head tightening mechanism in the center of said disks or head members.

The invention has for a further object, the provision of a head of the above stated character, in which the concavo-convex disks or head members will be securely locked together at spaced distances along their edges to allow a transverse spreading of said disks or head members as well as a radial spreading of the same, as the spaced apart central portions of said disks or head members are drawn together to tighten the head in a barrel or the like.

The invention has for a still further object, the provision of a head of this character in which the disks or head members will be arranged with their convex faces outwardly and the edges of said disks or head members interlocked and connected so that they will spread and move together as they are forced outwardly into the croze of a barrel or the like, as the centers of said disks or head members are drawn toward one another to tighten the head and secure the same in the barrel or other receptacle within which it is placed.

A still further object of the invention resides in the provision of a head of this character which will be strong and durable and may be readily inserted in a barrel or other receptacle or removed from the same, and will be of such construction that it may be readily sealed after being secured in position by suitable means, such as the sealing means disclosed in our previously referred to co-pending application, Serial No. 20,453.

With these and other objects in view, the invention consists in the novel construction, combination and arrangement of parts, as will be hereinafter more in detail described, and the asserted novelty specifically pointed out in the claims.

In the accompanying drawings, which clearly and fully illustrate the invention:—

Figure 2:
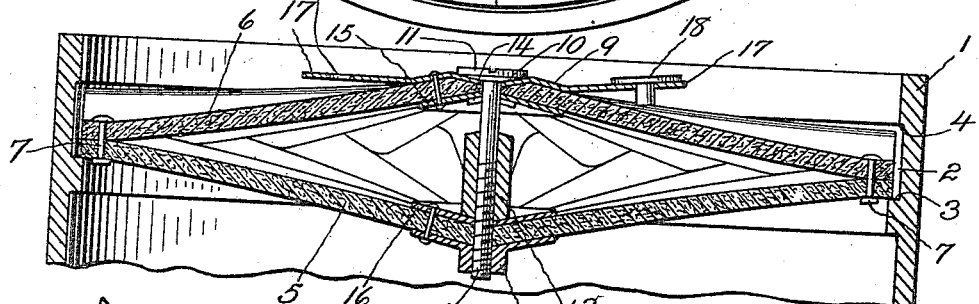
Figure 6:
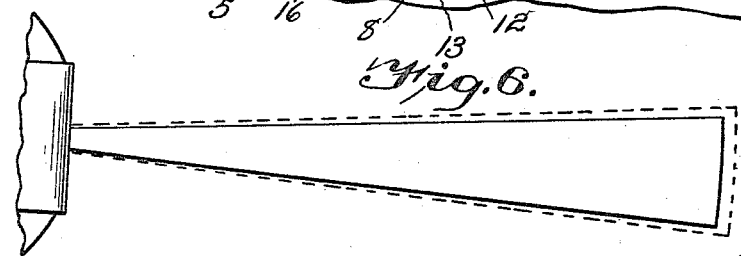

Figure 1 is a top plan view of a barrel head constructed in accordance with this invention and resting in a cylindrical receptacle of conventional form, Fig. 2 is a transverse vertical section through the same, Fig. 3 is a view similar to Fig. 1, showing the head after the same has been securely fastened and sealed in position, Fig. 4 is a transverse vertical section of Fig. 3, Fig. 5 is a fragmentary edge elevation of the head, showing the interlocking of the corrugations of the head sections, and Fig. 6 is a fragmentary detail plan view of the head, showing in dotted lines the radial and transverse expansion.

Referring more particularly to the drawings, in which similar reference characters designate corresponding parts throughout the several views, 1 designates a barrel or other receptacle of cylindrical form, of which we have shown only the upper portion, and which is provided with a croze 2 adjacent its end, and which croze is shown as being produced by slightly decreasing the interior diameter of the receptacle above and below the point at which the croze 2 is located, thereby providing the lower shoulder 3 and upper shoulder 4 of said croze 2, with the lower shoulder 3 projecting slightly farther toward the longitudinal center of the receptacle than the upper shoulder 4, so that the connected and radially corrugated disks 5 and 6 may be readily placed in position to rest upon said lower shoulder 3, as will be readily understood by referring to Figs. 1 and 2 of the drawings. The disks 5 and 6 are preferably formed of compressed pulp or fiber of slightly flexible character, though other materials may be used.

The first mentioned or inner disk 5 of the head is arranged so that the radial corrugations thereof are offset from the radial corrugations of the second mentioned or outer disk 6 of said head, and said disks 5 and 6 have their convex faces positioned outwardly to space the central portions of said disks from one another, while the corrugated edges of said disks are brought together and interlocked, as will be readily seen by referring to the drawings, thereby closing the space between the edges of said disks and preventing the entrance of dust or other foreign matter or the insertion of a tool between said disks for the purpose of tampering with the head tightening mechanism extending through the central portions of said disks 5 and 6, and which will be later described.

The disks 5 and 6 are securely fastened together at spaced distances along their edges, by suitable permanent securing members 7, which prevent said disks 5 and 6 from being separated. The permanent securing members 7 also prevent the edge of one of the disks 5 and 6 from moving outwardly beyond the edge of the remaining or opposite disk and further prevent rotary movement of one disk independent of the remaining disk, and at the same time permit the disks 5 and 6 to spread transversely or flatten out between said permanent securing members 7, as the central portions of said disks 5 and 6 are drawn together and the edges of said disks 5 and 6 thereby forced outwardly. The radial and transverse expansion of the disks 5 and 6 of the head is indicated by dotted lines in the fragmentary plan view (Fig. 6), and will be readily understood by referring to this figure.

While any suitable head tightening means may be employed for drawing together the central portions of said disks 5 and 6, we have shown a tightening screw 8 extended through a plate 9 secured upon the outer convex face of the outer disk 6 and having a countersunk central apertured portion 10 to accommodate the screw head 11 when the disks 5 and 6 are drawn together, it being understood that the tightening screw 8, after being extended through a spacing block 12, is threaded through a central plate 13 carried by the inner disk 5, so that rotation of the tightening screw 8 in one direction will draw toward one another the central portions of the disks 5 and 6 and thereby spread the same radially and cause a transverse spreading of the connected edges of said disks 5 and 6 to tighten the same against the vertical or main wall of the croze 2. It will be evident that rotation of the tightening screw 8 in the reverse direction will permit an outward movement of the central portions of the disks 5 and 6 and thereby allow the latter to resume their original or normal positions, and withdraw the connected edges of said disks 5 and 6 from binding engagement with the vertical or main wall of the croze 2, so that the head may be readily withdrawn or removed from the receptacle. It will also be understood that the tightening screw 8 is prevented from working out of position by means of a locking pin 14 extended through the same and bearing against an inner protecting plate 15 secured to the inner face of the central portion of the outer disk 6 to prevent injury to the latter. Injury to the disk 5 is also prevented by the inner protecting plate 16 secured to the inner face of the central portion of said inner disk 5 and also serving as a support for the spacing block 12, previously mentioned.

While any suitable sealing means may be employed to prevent unauthorized parties from reaching and tampering with the tightening screw 8, we have shown the plate 9 as being provided with oppositely extended ears 17, which may be readily bent over the screw head 11 and overlapped, as shown in the drawings, one of the ears 17 carrying a stud 18 which extends through a recess 19 formed in the remaining ear 17 and formed of such material that a blow upon the stud will flatten out the same to form a locking or sealing head 20, and thereby prevent the ears 17 from being again bent outwardly to expose the screw head 11 without first destroying the sealing stud 18. It will therefore be seen that unauthorized parties will not be able to remove the head after it has once been secured in position and sealed, without leaving evidence of their act.

It will be understood that while we have shown and described this form of sealing means, which is also clearly described in our co-pending application, Serial No. 20,453, any other suitable sealing means may be employed in connection with this form of head.

While the preferred embodiment of the invention has been shown and illustrated, it will be understood that minor changes in the details of construction, combination and arrangement of parts may be made within the scope of the appended claims without departing from the spirit of the invention or sacrificing any of the advantages of the same.

What is claimed is:—

1. A receptacle closing head comprising a pair of expanding disks connected at their outer edges and capable of making a tight joint at their edges with a receptacle when they are expanded.

2. A head comprising a pair of corrugated disks, means for forcing outwardly the edges of said disks, and means for securing together the edges of said disks and causing the transverse spreading action of the same as said edges move outwardly.

3. A head comprising a pair of corrugated disks having their edges interlocked, means for securing together said edges, and means for drawing together the centers of said disks to expand the head.

4. A head comprising a pair of concavo-convex disks, means for securing together the edges of said disks, and means for causing a radial and transverse expansion of said disks.

5. A head comprising a pair of disks having their edges connected and their central portions spaced apart, means for drawing together the central portions of said disks and causing an outward movement of the edges thereof, and means for covering and protecting the last mentioned means.

6. A head comprising a pair of corrugated disks having convex outer faces, the edges of said disks being interlocked and the corrugations of said disks being offset from one another, means for drawing together the central portions of said disks to cause an expansion of the same and thereby increase the diameter of the head, and spaced securing members for connecting the edges of said disks and causing said edges to move together during expansion of said disks.

7. A head comprising a pair of radially corrugated concavo-convex disks, means for securing together the edges of said disks, the corrugations of each disk being offset from the corrugations of the opposite disk, said disks having their convex faces positioned outwardly, means for drawing toward one another the central portions of said disks, and means for reinforcing the central portions of said disks, means for limiting inward movement of the central portions of said disks, and a protecting seal for the means for drawing the central portions of the disks toward one another.

In testimony whereof we affix our signatures.

ARTHUR J. HODGE.
HENRY B. RUGGLES.

Copies of this patent may be obtained for five cents each, by addressing the "Commissioner of Patents, Washington, D. C."